United States Patent
Tanaka

(10) Patent No.: US 9,457,622 B2
(45) Date of Patent: Oct. 4, 2016

(54) PNEUMATIC TIRE

(71) Applicant: SUMITOMO RUBBER INDUSTRIES, LTD., Kobe-shi, Hyogo (JP)

(72) Inventor: Susumu Tanaka, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 734 days.

(21) Appl. No.: 13/865,238

(22) Filed: Apr. 18, 2013

(65) Prior Publication Data

US 2013/0292021 A1    Nov. 7, 2013

(30) Foreign Application Priority Data

May 2, 2012   (JP) .................. 2012-105421

(51) Int. Cl.
| | |
|---|---|
| B60C 9/18 | (2006.01) |
| B60C 9/20 | (2006.01) |
| B60C 11/03 | (2006.01) |
| B60C 11/117 | (2006.01) |

(Continued)

(52) U.S. Cl.
CPC ............. *B60C 11/0327* (2013.04); *B60C 9/20* (2013.01); *B60C 11/0306* (2013.04); *B60C 11/1369* (2013.04); *B60C 2011/0358* (2013.04); *B60C 2011/0365* (2013.04); *B60C 2011/0372* (2013.04); *B60C 2011/0395* (2013.04); *B60C 2011/1254* (2013.04)

(58) Field of Classification Search
CPC ........... B60C 11/0306; B60C 11/1353; B60C 11/1369; B60C 2011/036; B60C 2011/0365; B60C 2011/0374; B60C 2011/0376; B60C 2011/1361; B60C 2011/0372; B60C 2011/0395

USPC .................................................... 152/209.19
See application file for complete search history.

(56) References Cited

U.S. PATENT DOCUMENTS

| | | | | |
|---|---|---|---|---|
| 4,690,189 A | * | 9/1987 | Bradisse ............. | B60C 11/0302 152/209.15 |
| 4,819,704 A | * | 4/1989 | Misawa ................. | B60C 11/11 152/209.1 |

(Continued)

FOREIGN PATENT DOCUMENTS

| | | | | |
|---|---|---|---|---|
| JP | 07144511 A | * | 6/1995 | |
| JP | 3012686 B2 | * | 2/2000 | ............. B60C 11/13 |

(Continued)

OTHER PUBLICATIONS

Machine Translation: JP 2010173346 A; Nagayoshi, Katsutomo; no date.*

(Continued)

*Primary Examiner* — Steven D Maki
*Assistant Examiner* — Kendra Ly
(74) *Attorney, Agent, or Firm* — Birch, Stewart, Kolasch & Birch, LLP

(57) ABSTRACT

A pneumatic tire comprises a tread portion provided with a radially outermost breaker ply and three main grooves extending in the tire circumferential direction. Crown axial grooves disposed between the main grooves are inclined oppositely to cords of the radially outermost breaker ply, at angles in a range of from 10 to 60 degrees with respect to the tire circumferential direction. The crown axial groove comprises a narrow portion and a resultant wide portion on the axially outside thereof. The crown axial groove is provided in its axially outer end portion with a tie bar provided with a sipe.

11 Claims, 8 Drawing Sheets

(51) Int. Cl.
*B60C 11/12* (2006.01)
*B60C 11/13* (2006.01)

(56) References Cited

U.S. PATENT DOCUMENTS

| | | | |
|---|---|---|---|
| 5,135,038 A * | 8/1992 | Graas | B60C 11/0306 152/209.18 |
| 5,960,845 A * | 10/1999 | Wada | B60C 11/0309 152/209.23 |
| 7,434,606 B2 | 10/2008 | Miyabe et al. | |
| 2010/0186861 A1* | 7/2010 | Ishiguro | B60C 11/0306 152/209.25 |
| 2013/0167996 A1* | 7/2013 | Oda | B60C 11/04 152/209.18 |

FOREIGN PATENT DOCUMENTS

| JP | 2002019423 A | * | 1/2002 |
| JP | 2005126007 A | * | 5/2005 |
| JP | 2010173346 A | * | 8/2010 |

OTHER PUBLICATIONS

Machine Translation: JP 2002019423 A; Kachi, Yoshio; no date.*
Machine Translation: JP 3012686 B2; Furuya, Shinichi; no date.*
Machine Translation: JP 07144511 A; Kajita, Hiroaki; no date.*
Machine Translation: JP 2005126007; Yanagisawa, Manabu; no date.*

* cited by examiner

PNEUMATIC TIRE

BACKGROUND OF THE INVENTION

The present invention relates to a pneumatic tire, more particularly to a structure of a tread portion, including a tread pattern and a reinforcing cord layer, capable of improving the noise performance, steering stability and hydroplaning resistance.

Heretofore, in order to improve the hydroplaning resistance of a tire, widely employed techniques are to increase the number, widths and depths of tread grooves. Such techniques, however, involve problems with a decrease in the tread pattern rigidity, deterioration in the steering stability and deterioration in the noise performance on the dry road.

U.S. Pat. No. 7,434,606 discloses a tire provided with a tread pattern as shown in FIG. 8, wherein the tread portion (a) is divided by four circumferential grooves (b1 and b2) into a central land portion (c1), two middle land zones (c2) and two should land zones (c3). Oblique grooves (e) disposed in the middle land zones c2 are curved, gradually increasing the inclination angle θ from about zero to about 90 degrees with respect to the tire circumferential direction, toward the axially outside, and oblique grooves disposed in the should land zones (c3) are extends from the adjacent circumferential grooves (b2) to the tread edges in order to enhance the drainage. On the other hand, the axially inner ends of the oblique grooves (e) are terminated within the middle land zones (c2). The central land portion (c1) and the middle land zones (c2) extend continuously in the tire circumferential direction in order to increase the rigidity and thereby improve the steering stability. In such tire, the noise performance, steering stability and hydroplaning resistance are good, but there are rooms for improvement.

SUMMARY OF THE INVENTION

It is therefore, an object of the present invention to provide a pneumatic tire, in which the noise performance, steering stability and hydroplaning resistance are improved.

According to the present invention, a pneumatic tire comprises a tread portion, a pair of sidewall portions, a pair of bead portions, a carcass extending between the bead portions, and a belt disposed radially outside the carcass in the tread portion, wherein the belt comprises a radially outermost breaker ply composed of parallel cords inclined with respect to the tire circumferential direction, the tread portion is provided with circumferentially extending main grooves including a central main groove disposed on the tire equator and a pair of shoulder main grooves disposed one on each side of the tire equator, and crown axial grooves extending from the central main groove to the shoulder main grooves, the crown axial grooves are inclined with respect to the tire circumferential direction, oppositely to the cords of the radially outermost breaker ply, at an inclination angle in a range of from 10 to 60 degrees, the crown axial grooves each comprise a narrow portion whose width is in a range of from 0.3 to 1.0 mm, and a wide portion extending axially outwardly from the axially outer end of the narrow portion and having a width gradually increasing toward the shoulder main groove, the crown axial grooves are each provided in its axially outer end portion with a tie bar protruding from the groove bottom and provided with a sipe extending along the crown axial groove.

Therefore, by the cross arrangement of the crown axial grooves and the radially outermost breaker cords, the rigidity of the tread portion is improved and the steering stability can be improved. By the crown axial grooves inclined at the angles of 10 to 60 degrees, the hydroplaning resistance is improved, and impact sound generated when the groove edges hit the ground is reduced to improve the noise performance.

The narrow portions of the crown axial grooves increase the rigidity of the tread portion where the narrow portions are formed, and further, prevent a pipe resonance sound, possibly occurring in the central main groove, from leaking to the crown axial grooves to improve the noise performance.

The siped tie bars in the crown axial grooves increase the rigidity of the tread portion where the siped tie bars are formed in order to improve the steering stability.

The sipes of the tie bars reduce air pumping sound and high-frequency noise, and further help to increase the drainage of the crown axial grooves to improve the hydroplaning resistance.

The pneumatic tire according to the present invention may be provided with the following features (a)-(g):

(a) the tread portion is provided with a circumferential sipe extending between the wide portions of every two of the circumferentially adjacent crown axial grooves;

(b) the circumferential sipe has a width in a range of from 0.4 to 1.5 mm;

(c) the sipe of the tie bar is opened at both ends of the tie bar;

(d) the axial length L2 of the narrow portion of the crown axial groove is in a range of from 0.10 to 0.60 time the axial length L1 of the crown axial groove;

(e) the height of the tie bar is in a range of from 1.0 to 3.5 mm;

(f) the tread portion is provided with shoulder axial grooves extending axially outwardly from the shoulder main grooves, and the shoulder axial grooves are inclined with respect to the tire circumferential direction, to the same direction as the cords of the radially outermost breaker ply;

(g) the tread portion is provided with a circumferential sipe extending between every two of the circumferentially adjacent shoulder axial grooves.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/

Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa.

The tread edges Te are the axial outermost edges of the ground contacting patch of the tire (camber angle=0) in the normally inflated loaded condition.

DESCRIPTION OF THE PREFERRED EMBODIMENTS

Figure 1:
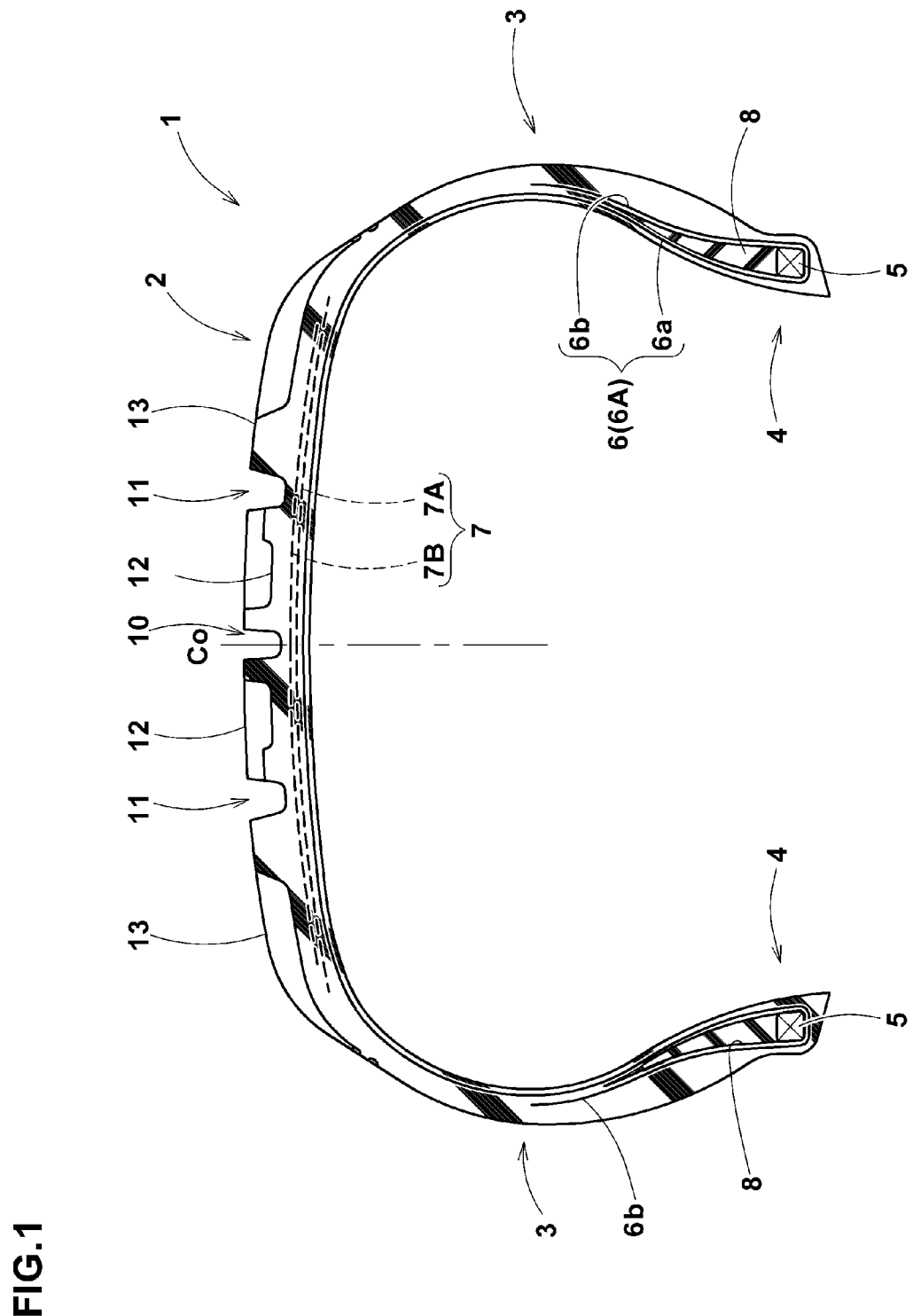
FIG. 1 is a cross sectional view of a pneumatic tire as an embodiment of the present invention.

Embodiments of the present invention will now be described in detail in conjunction with the accompanying drawings.

In the drawings, pneumatic tire 1 according to the present invention is a passenger car tire comprising a tread portion 2, a pair of axially spaced bead portions 4 each with a bead core 5 therein, a pair of sidewall portions 3 extending between the tread edges Te and the bead portions 4, a carcass 6 extending between the bead portions 4, and a tread reinforcing belt 7 disposed radially outside the carcass 6 in the tread portion 2.

The carcass 6 is composed of at least one ply 6A of cords arranged radially at an angle in the range of from 75 to 90 degrees with respect to the tire equator Co, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A of cords arranged radially at an angle of 90 degrees with respect to the tire equator Co. For the carcass cords, organic fiber cords, e.g. nylon, polyester, rayon and aromatic polyamide and the like, metallic cords, or the like may be used.

The bead portions 4 are each provided between the main portion 6a and turned up portion 6b of the carcass ply with a bead apex 8. The bead apex 8 is made of hard rubber extending radially outwards from the radially outside of the bead core 5, while tapering towards its radially outer end.

The belt 7 comprises at least one breaker ply, in this embodiment two cross breaker plies 7A and 7B, of breaker cords 7c laid at an angle of from 10 to 35 degrees with respect to the tire equator Co, and optionally a band ply of a band cord or cords wound on the radially outside of the breaker at a small angle of at most about 5 degrees for example almost zero degree with respect to the tire equator Co. For the breaker cords 7c, steel cords or organic fiber cords, e.g. nylon, polyester, rayon, aromatic polyamide and the like may be used.

Figure 2:
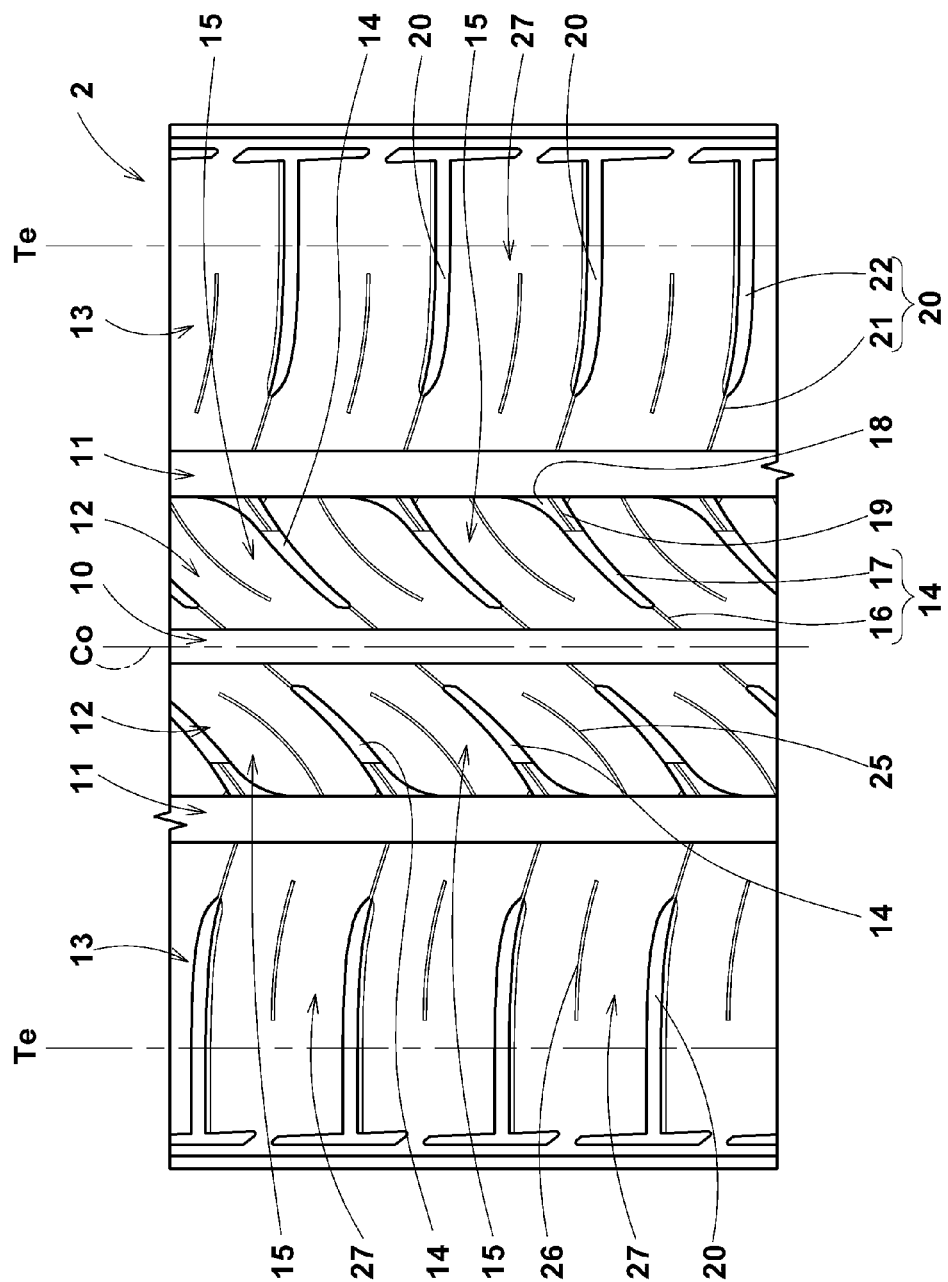
FIG. 2 is a developed partial view of the tread portion.

The tread portion 2 is, as shown in FIG. 2, provided with circumferentially extending main grooves which are a central main groove 10 disposed on the tire equator Co, and a shoulder main groove 11 disposed on each side of the tire equator Co.

The main grooves are for the purpose of drainage, therefore, in this embodiment, the main grooves 10 and 11 each have a width of from 6 to 12 mm, and a depth of from 7 to 12 mm. Further, the main grooves 10 and 11 are formed as a straight groove to enhance the drainage.

The tread portion 2 is accordingly divided into crown land zones 12 between the main grooves 10 and main grooves 11, and should land zones 13 axially outside the main grooves 11.

Each of the crown land zones 12 is provided with crown axial grooves 14 extending from the central main groove 10 to the shoulder main groove 11 so that the crown land zone 12 is divided into crown blocks 15 in a row.

Each of the should land zones 13 is provided with shoulder axial grooves 20 extending axially outwardly from the shoulder main groove 11 to the tread edge Te so that the should land zone 13 is divided into shoulder blocks 27 in a row.

Figure 3:
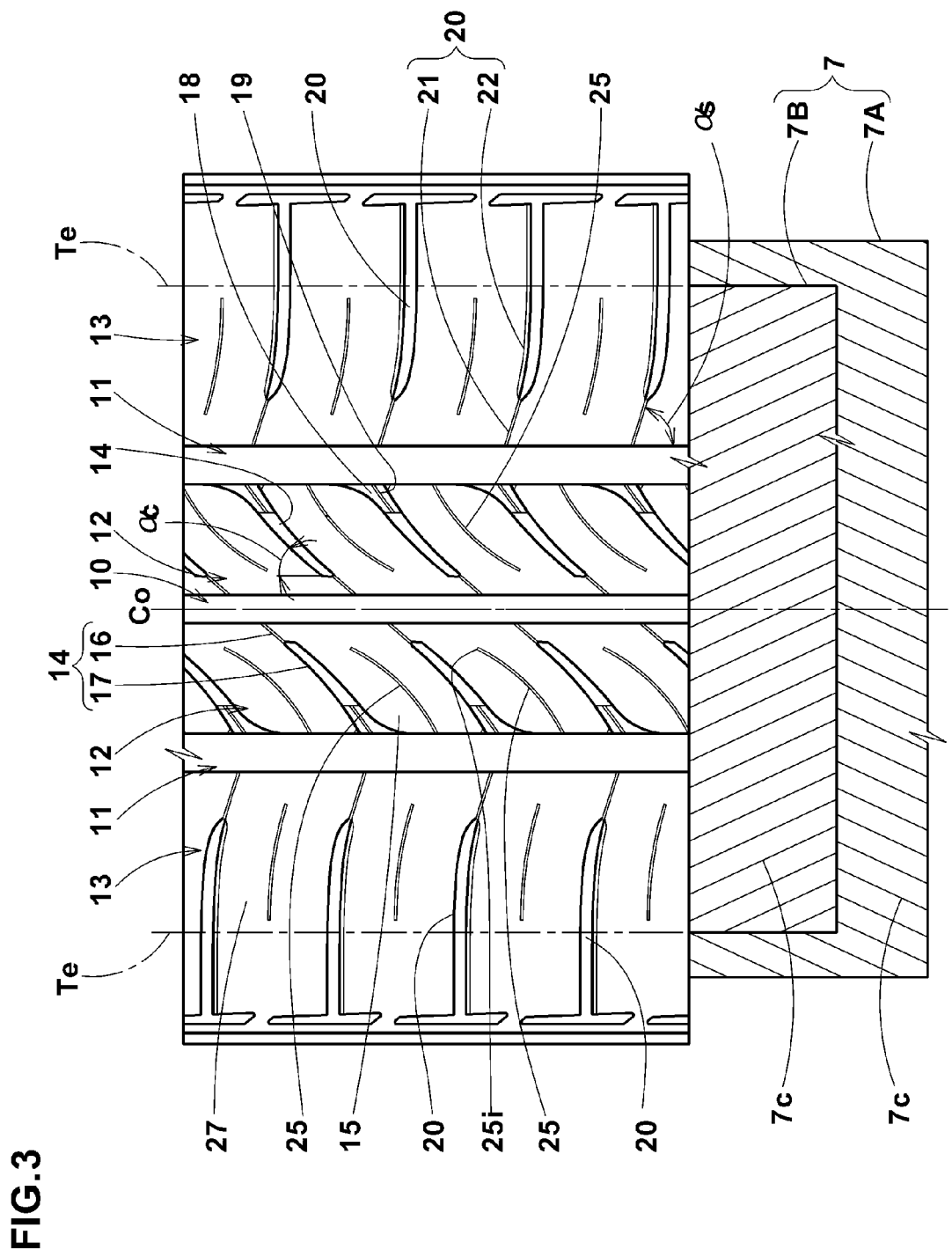
FIG. 3 shows inclinations of the tread grooves and breaker cords.

As shown in FIG. 3, with respect to the tire circumferential direction, the crown axial grooves 14 are inclined oppositely to the breaker cords 7c of the radially outermost breaker ply (in this example ply 7B).

In FIG. 3, the inclination of the breaker cords 7c is downward to the right, and the inclination of all of the crown axial grooves 14 is upward to the right.

The radially outermost breaker ply has an axial width more than the axial width between the two shoulder main grooves 11, in this example in a range of from 80 to 110% of the tread width or the axial width between the tread edges Te.

In general, the tread portion 2 is liable to bent along a groove and thereby the bending rigidity is decreased. In the present invention, the decrease in the bending rigidity of the tread portion 2 due to the crown axial grooves 14 is compensated by the breaker cords 7c inclined oppositely to the crown axial grooves 14, therefore, the steering stability is improved.

The inclination angle $\alpha c$ of the crown axial groove 14 with respect to the tire circumferential direction is set in a range of not less than 10 degrees, but not more than 60 degrees. If the angle $\alpha c$ is less than 10 degrees, the axial tread pattern rigidity decreases, and the steering stability during cornering is decreased. If the angle $\alpha c$ is more than 60 degrees, the drainage tends to decrease. In order to effectively remove a water film and thereby improve the hydroplaning resistance, the inclination angle $\alpha c$ is preferably set in a range of not less than 40 degrees and not more than 50 degrees.

Further, it is preferable that the angle αc of the crown axial groove 14 is gradually increased from its axially inner end to its axially outer end.

Figure 4:
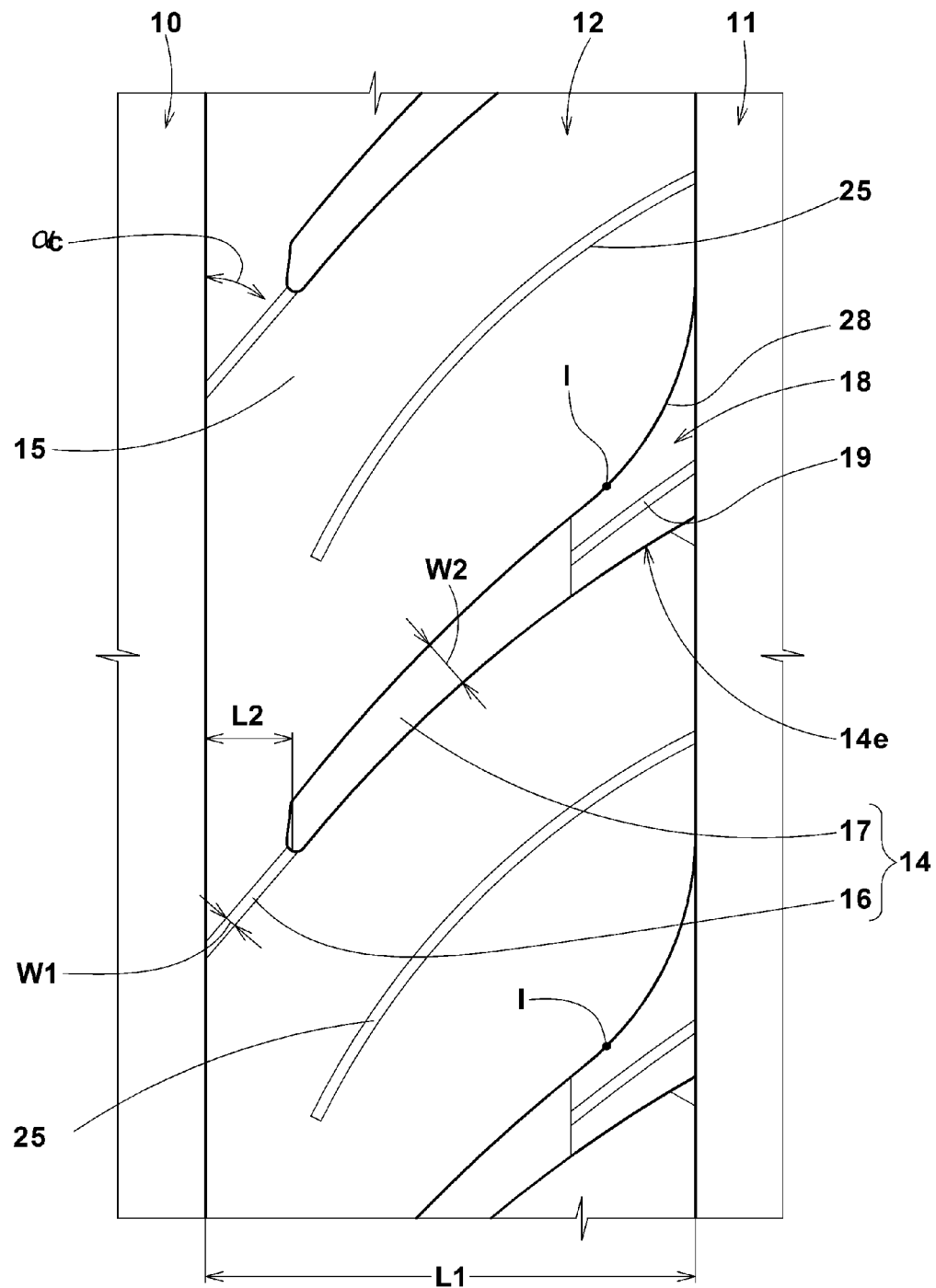
FIG. 4 is an enlarged top view of a crown axial groove shown in FIG. 2.

The crown axial groove 14 comprises a narrow portion 16 and a wide portion 17 as shown in FIG. 4.

The narrow portion 16 extends axially outwardly from its axially inner end at the central main groove 10. The width W1 of the narrow portion 16 is set in a range of from 0.3 to 1.0 mm.

The axial length L2 of the narrow portion 16 is set in a range of not less than 0.10 times, preferably not less than 0.30 times, but not more than 0.60 times, preferably not more than 0.40 times the axial length L1 of the crown axial groove 14.

By the narrow portions 16 configured as above, the tread pattern rigidity is increased in the vicinity of the central main groove 10 to improve the steering stability. Further, air flow from the central main groove 10 into the crown axial grooves 14 is blocked to improve the noise performance.

The entirety of the wide portion 17 is wider than the narrow portion 16, and the width W2 thereof is gradually increased toward it axially outer end which is opened to the shoulder main groove 11 in order to improve the drainage and thereby improve the hydroplaning resistance.

In an axially outer end portion 14e of the crown axial groove 14, as shown in FIG. 4, the curvature of one of the edges 28 of the wide portion 17 is maintained, but the curvature of the other of the edges 28 is changed to curve toward the outside of the groove so that the increase in the groove width W2 is furthered toward the axially outer end and an inflection point (I) is formed.

Figure 5A:
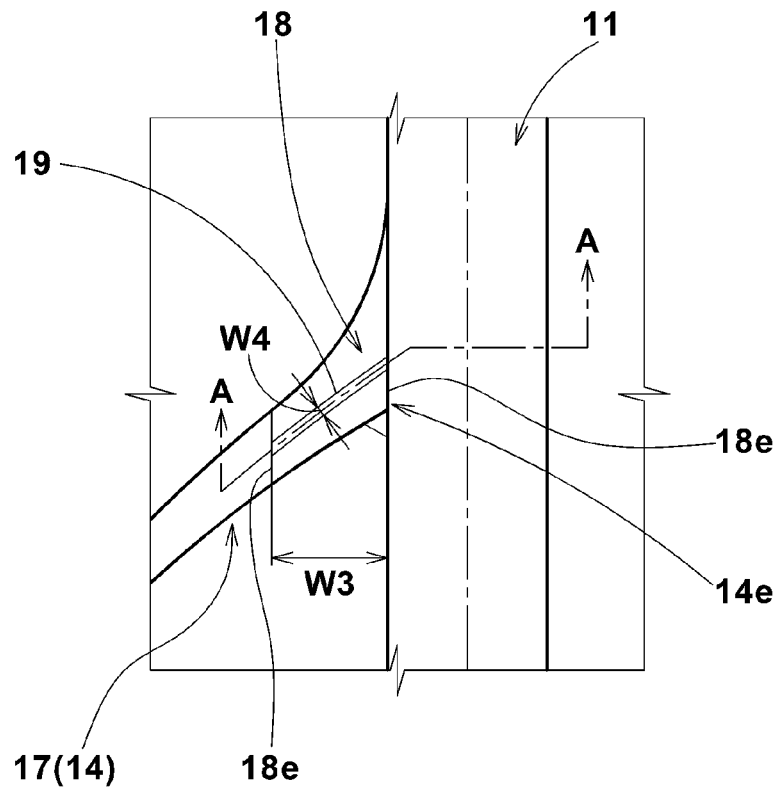
FIG. 5A is an enlarged view showing an axially outer end portion of the crown axial groove shown in FIG. 4.
Figure 5B:
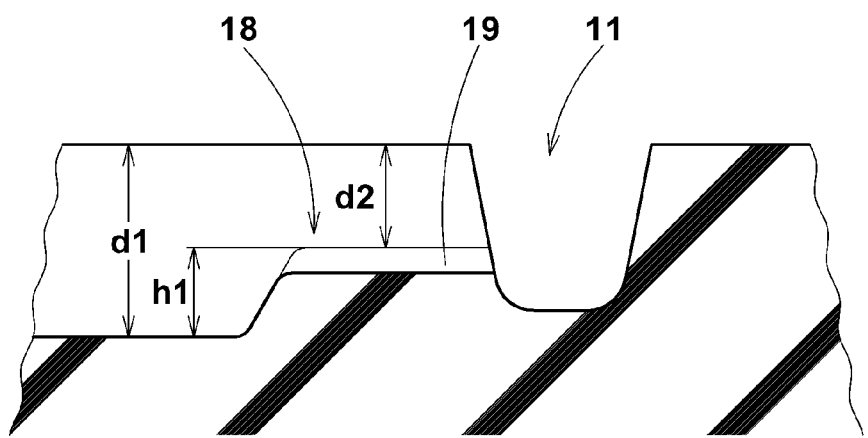
FIG. 5B is a cross sectional view taken along line A-A in FIG. 5A.

As shown in FIGS. 5A and 5B, the axially outer end portion 14e of the crown axial grooves 14 is provided with a tie bar 18 protruding from the groove bottom so as to extend from one of the opposed groove sidewalls to the other.

The height h1 of the tie bar 18 (namely, the difference between the maximum groove depth d1 of the crown axial groove 14 and the groove depth d2 of the crown axial groove 14 at the tie bar 18) is set in a range of not less than 1.0 mm, preferably not less than 2.0 mm, but not more than 3.5 mm, preferably not more than 2.5 mm.

The axial width W3 of the tie bar 18 is set in a range of not less than 0.10 times, preferably not less than 0.20 times, but not more than 0.40 times, preferably not more than 0.30 times the axial length L1 of the crown axial grooves 14.

In general, due to the wide portions 17 of the crown axial grooves 14, the rigidity of the crown blocks 15 is liable to decrease. However, such decrease in the rigidity can be prevented by the tie bars 18, without sacrificing the drainage.

The tie bar 18 is provided in its top surface with an axial sipe 19 extending along the widthwise center line of the crown axial groove 14. The width W4 of the axial sipe 19 is set in a range of 0.3 to 1.0 mm. Preferably, the axial sipe 19 extends from one end 18e to the other end 18e of the tie bar 18.

In general, a tie bar formed in a groove decreases the cross sectional area of the groove, therefore, the air flowing through the position of the tie bar is increased in the flow velocity and so called air pumping sound is generated.

However, by the sipe 19, the groove width in the position of the tie bar can increase immediately before the crown blocks 15 contact with the ground, and the air in the groove is released without generating the pumping sound. Consequently, the noise performance is improved.

In a wet condition, similarly to the air flow, the water in the groove is discharged immediately before the crown blocks 15 contact with the ground, therefore, the aquaplaning resistance is prevented from deteriorating. Further, even if the tread wear is progressed and reached to the tie bar, the sipe 19 exerts its edge effect, therefore, wet performance is maintained.

In the example shown in FIG. 3, the crown land zones 12 are each provided with a crown sipe 25 between every two of the circumferential adjacent crown axial grooves 14. In other words, each of the crown blocks 15 is provided with a crown sipe 25.

The crown sipes 25 extend axially inwardly from the shoulder main grooves 11, while inclining to the same direction as the crown axial grooves 14. The axially inner end 25i of the crown sipes 25 terminates within the crown block 15. Therefore, the rigidity of the crown blocks 15 are mitigated to improve the ride comfort.

Further, the should land zones 13 are each provided with shoulder axial grooves 20 extending axially outwardly from the shoulder main grooves 11.

The angle αs of the shoulder axial grooves 20 with respect to the tire circumferential direction is set in a range of from 70 to 90 degrees to effectively discharge a water existing between the should land zones 13 and the road surface, toward the axially outside.

With respect to the tire circumferential direction, the shoulder axial grooves 20 are inclined toward the same direction as the cords 7c of the radially outermost breaker ply. Therefore, the rigidity of the should land zones 13 is mitigated to improve the ride comfort.

Figure 6:
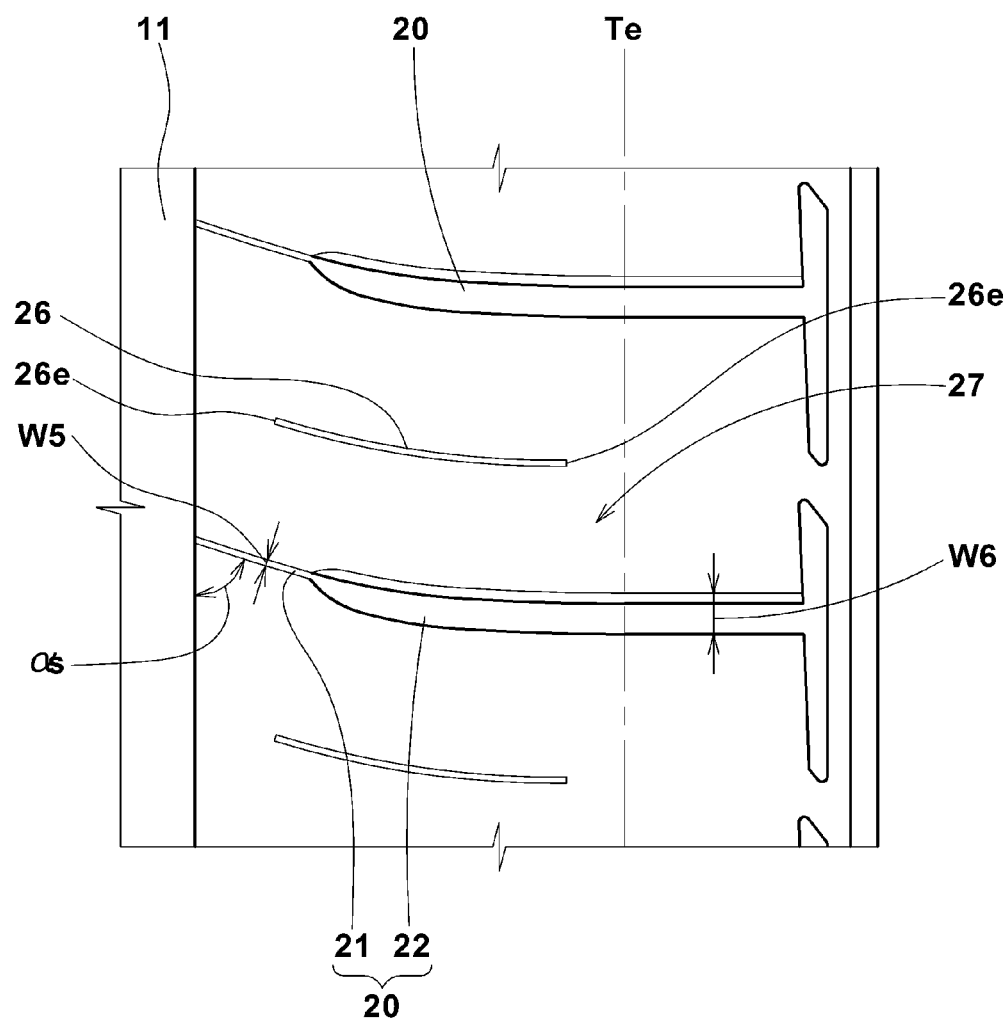
FIG. 6 is an enlarged top view of the should land zone shown in FIG. 2.

It is preferable that, as shown in FIG. 6, the shoulder axial groove 20 is provided with a narrow portion 21 and a resultant wide portion 22 in order to block air flow from the shoulder main groove 11 into the shoulder axial grooves 20, and thereby to prevent a leakage of the possible pipe resonance sound occurring in the shoulder main groove 11. Between the narrow portion 21 and the wide portion 22, a transitional portion whose width is gradually changed, is formed.

The narrow portion 21 has a width W5 of from 0.3 to 1.0 mm.

The wide portion 22 has a width W6 of from 2.0 to 8.0 mm.

In this example, the narrow portion 21 is opened to the shoulder main groove 11. At the tread edge Te, the wide portion 22 is opened toward the axially outside to improve the hydroplaning resistance.

Each of the shoulder blocks 27 is preferably provided with a shoulder sipe 26 extending axially and terminating without reaching to the tread edge Te.

In this example, both ends 26e of the shoulder sipe 26 are terminated within the shoulder block 27. Therefore, the ground contact during cornering is improved, while maintaining the rigidity of the shoulder blocks 27, and thereby the steering stability can be improved.

Figure 7:
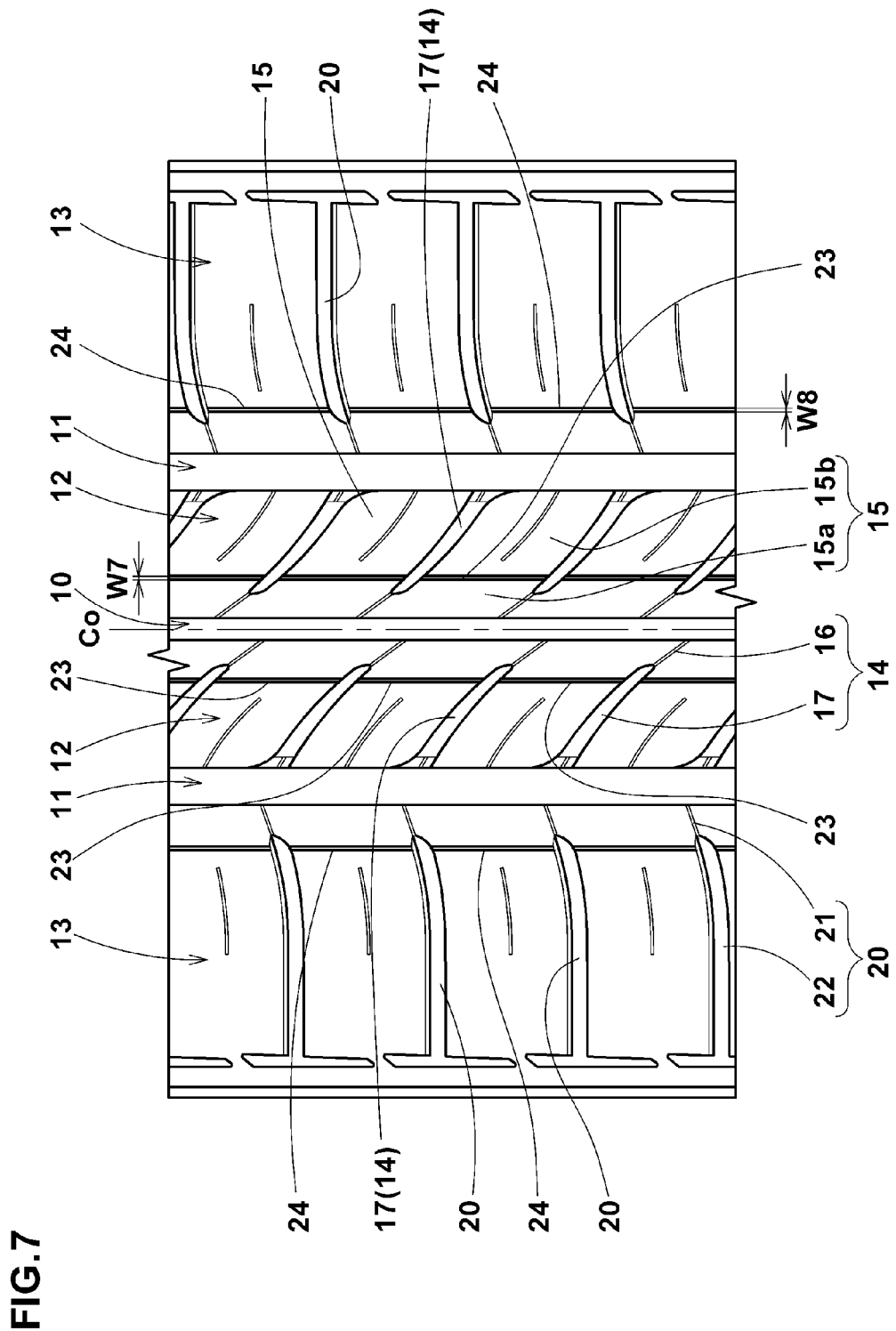
FIG. 7 is a developed partial view of the tread portion of a pneumatic tire as another embodiment of the present invention.
Figure 8:
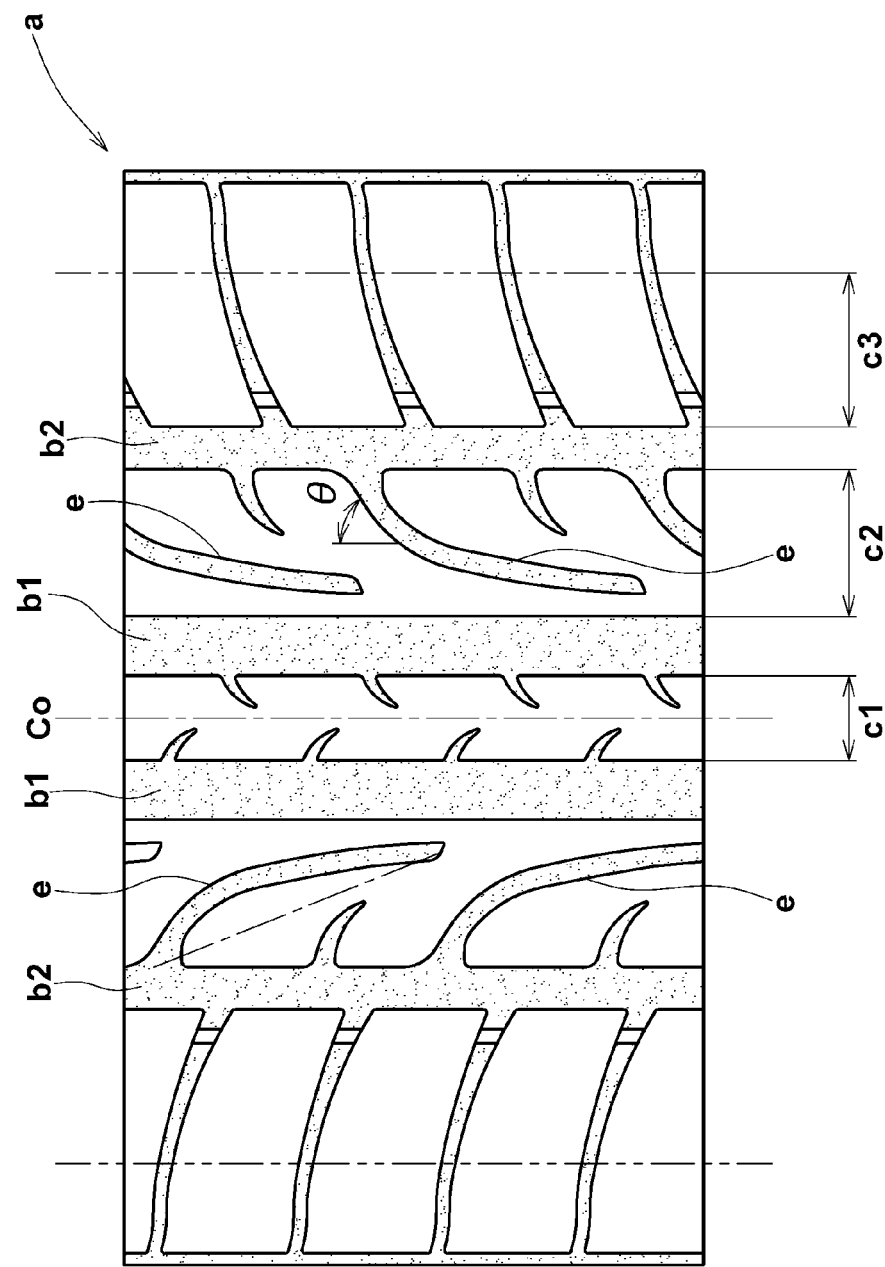
FIG. 8 is a developed partial view of the tread pattern of the prior art tire.

FIG. 7 shows the tread portion of a pneumatic tire as another embodiment of the present invention.

In this embodiment, when compared with the former embodiment shown in FIG. 3, the inclining directions of the breaker cords 7c are reversed (not shown), therefore, the inclining directions of the above-mentioned grooves and sipes (same reference numbers are used) are also reversed. Otherwise, the above description and limitations made in the former embodiment are also applied to this embodiment.

The crown blocks 13 are each provided with a circumferential sipe 23 extending between the wide portions 17 of the circumferentially adjacent crown axial grooves 14. By the circumferential sipe 23, the crown block 15 is divided into an axially inner block piece 15a and an axially outer block piece 15b.

The width W7 of the circumferential sipe 23 is set in a range of not less than 0.4 mm, preferably not less than 0.8 mm, but not more than 1.5 mm, preferably not more than 1.1 mm.

In each of the crown land zones 12, all of the circumferential sipes 23 are straight and are arranged in line in parallel with the tire circumferential direction.

Therefore, there are formed a central axial part between the circumferential sipes 23 of the two crown land zones 12, having a relatively high circumferential rigidity, and an outside axial part of each of the crown land zones 12 axially outside the circumferential sipes 23, having a relatively low circumferential rigidity, which parts are separated by the circumferential sipe 23.

As a result, the steering stability is improved by the central axial part, and the ride comfort is improved by the outside axial parts. Further, a drainage from the central axial part to the outside axial parts is furthered to improve the hydroplaning resistance.

In this embodiment, further, the shoulder blocks 27 are each provided with a circumferential sipe 24 extending between the wide portions 22 of the circumferentially adjacent shoulder axial grooves 20 for the same reason as the crown blocks 13. The width W8 of the circumferential sipe 24 is set in a range of not less than 0.4 mm, preferably not less than 0.8 mm, but not more than 1.5 mm, preferably not more than 1.1 mm.

In the embodiment shown in FIG. 7, the circumferential sipes 23 and 24 are provided. But, it is also possible to dispose only the circumferential sipes 23 or only the circumferential sipes 24.

Comparison Tests

Based on the tread pattern shown in FIG. 2, radial tires of size 195/65R15 (rim 15×6jj) for passenger cars, having the internal structure shown in FIG. 1, were prepared and tested for the aquaplaning performance, noise performance, steering stability and ride comfort.

COMPARATIVE EXAMPLES REF. 1-REF. 3:

The crown axial grooves were not provided with the narrow portion and tie bar.

COMPARATIVE EXAMPLES REF. 4-REF. 11:

The crown axial grooves were not provided with the tie bar but the narrow portion.

COMPARATIVE EXAMPLES REF. 12:

The crown axial grooves were provided with the narrow portion and tie bar but not provided with the axial sipe.

Common specifications are as follows:
Inclination of crown axial grooves: opposite to inclination of outermost breaker ply cords
Inclination angle $\alpha c$: 45 degrees
Inclination of shoulder axial grooves: same as inclination of outermost breaker ply cords
Inclination angle $\alpha s$: 75 degrees
Width W5 of narrow portion: 1.0 mm
Width W6 of wide portion: 5.0 mm <Aquaplaning Performance Test>

A test car, Japanese 1800 cc FF passenger car, provided on all four wheels with test tires (pressure: 230 kPa) was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on Comparative example Ref. 1 being 100, wherein the larger is better.

<Noise Performance Test>

Road noise was measured in the inside of the above-mentioned test car during running on a roughened surface of a dry asphalt road in a road noise test course. The measured values are evaluated into ten ranks and indicated in Table 1, wherein the higher the rank number, the better the road noise.

<Steering Stability and Ride Comfort Test>

The test car was run on a dry asphalt in a tire test course, and the test driver evaluated the steering stability and ride comfort into ten ranks. The results are indicated in Table 1, wherein the higher rank number is better.

TABLE 1

| Tire | Ref. 1 | Ref. 2 | Ref. 3 | Ref. 4 | Ref. 5 | Ref. 6 | Ref. 7 | Ref. 8 |
|---|---|---|---|---|---|---|---|---|
| narrow portion 21 provided ? | N | N | N | Y | Y | Y | Y | Y |
| width W1 (mm) | — | — | — | 0.6 | 0.6 | 1.2 | 0.3 | 1.0 |
| L2/L1 | — | — | — | 0.08 | 0.70 | 0.25 | 0.25 | 0.25 |
| wide portion 22 width W2 (mm) | 2.5 | 1.2 | 5.5 | 2.5 | 2.5 | 2.5 | 2.5 | 2.5 |
| tie bar 18 provided ? | N | N | N | N | N | N | N | N |
| height h1 (mm) | — | — | — | — | — | — | — | — |
| sipe 19 provided ? | — | — | — | — | — | — | — | — |
| sipes 23 provided ? | N | N | N | N | N | N | N | N |
| width W7 (mm) | — | — | — | — | — | — | — | — |
| sipes 24 provided ? | N | N | N | N | N | N | N | N |
| width W8 (mm) | — | — | — | — | — | — | — | — |
| hydroplaning resistance | 100 | 99 | 105 | 99 | 95 | 100 | 99 | 100 |
| noise performance | 6 | 6.5 | 6.0 | 6.5 | 7.0 | 6.0 | 6.5 | 6.5 |
| steering stability | 6.5 | 7.0 | 6.0 | 6.5 | 7.5 | 6.5 | 7.0 | 7.0 |
| ride comfort | 6.5 | 6.0 | 6.5 | 6.5 | 6.0 | 6.5 | 6.5 | 6.5 |

| Tire | Ref. 9 | Ref. 10 | Ref. 11 | Ref. 12 | Ex. 1 | Ex. 2 | Ex. 3 | Ex. 4 |
|---|---|---|---|---|---|---|---|---|
| narrow portion 21 provided ? | Y | Y | Y | Y | Y | Y | Y | Y |
| width W1 (mm) | 0.6 | 0.6 | 0.6 | 0.6 | 0.6 | 0.6 | 0.6 | 0.6 |
| L2/L1 | 0.10 | 0.60 | 0.25 | 0.25 | 0.25 | 0.25 | 0.25 | 0.25 |
| wide portion 22 width W2 (mm) | 2.5 | 2.5 | 2.5 | 2.5 | 2.5 | 2.5 | 2.5 | 2.5 |

TABLE 1-continued

| | | | | | | | | |
|---|---|---|---|---|---|---|---|---|
| tie bar 18 provided ? | N | N | N | Y | Y | Y | Y | Y |
| height h1 (mm) | — | — | — | 0.8 | 0.8 | 1.0 | 3.5 | 4.0 |
| sipe 19 provided ? | — | — | — | N | Y | Y | Y | Y |
| sipes 23 provided ? | N | N | N | N | N | N | N | N |
| width W7 (mm) | — | — | — | — | — | — | — | — |
| sipes 24 provided ? | N | N | N | N | N | N | N | N |
| width W8 (mm) | — | — | — | — | — | — | — | — |
| hydroplaning resistance | 100 | 99 | 100.0 | 98 | 100 | 100 | 100 | 98 |
| noise performance | 6.5 | 7.0 | 6.5 | 6.0 | 6.5 | 6.75 | 7.0 | 6.25 |
| steering stability | 7.0 | 7.5 | 7.0 | 7.25 | 7.0 | 7.25 | 7.5 | 7.5 |
| ride comfort | 6.5 | 6.0 | 6.5 | 6.5 | 6.5 | 6.5 | 6.5 | 6.5 |

| Tire | Ex. 5 | Ex. 6 | Ex. 7 | Ex. 8 | Ex. 9 | Ex. 10 |
|---|---|---|---|---|---|---|
| narrow portion 21 provided ? | Y | Y | Y | Y | Y | Y |
| width W1 (mm) | 0.6 | 0.6 | 0.6 | 0.6 | 0.6 | 0.6 |
| L2/L1 | 0.25 | 0.25 | 0.25 | 0.25 | 0.25 | 0.25 |
| wide portion 22 width W2 (mm) | 2.5 | 2.5 | 2.5 | 2.5 | 2.5 | 2.5 |
| tie bar 18 provided ? | Y | Y | Y | Y | Y | Y |
| height h1 (mm) | 2.5 | 2.5 | 2.5 | 2.5 | 2.5 | 2.5 |
| sipe 19 provided ? | Y | Y | Y | Y | Y | Y |
| sipes 23 provided ? | N | Y | Y | Y | Y | N |
| width W7 (mm) | — | 0.3 | 1.7 | 0.8 | 0.8 | — |
| sipes 24 provided ? | N | Y | Y | Y | N | Y |
| width W8 (mm) | — | 0.3 | 1.7 | 0.8 | — | 0.8 |
| hydroplaning resistance | 100 | 100 | 105 | 105 | 104 | 103 |
| noise performance | 7.0 | 7.0 | 7.0 | 7.0 | 7.0 | 7.0 |
| steering stability | 7.5 | 7.5 | 7.0 | 7.5 | 7.5 | 7.5 |
| ride comfort | 6.5 | 6.5 | 6.75 | 6.75 | 6.5 | 6.75 |

The invention claimed is:

1. A pneumatic tire comprising
a tread portion,
a pair of sidewall portions,
a pair of bead portions,
a carcass extending between the bead portions, and
a belt disposed radially outside the carcass in the tread portion, wherein
the belt comprises a radially outermost breaker ply composed of parallel cords inclined with respect to the tire circumferential direction,
the tread portion is provided with
circumferentially extending main grooves including a central main groove disposed on the tire equator and a pair of shoulder main grooves disposed one on each side of the tire equator, crown axial grooves extending from the central main groove to the shoulder main grooves, and shoulder axial grooves extending from the shoulder main grooves to tread edges,
the crown axial grooves are each inclined with respect to the tire circumferential direction, oppositely to the cords of the radially outermost breaker ply, at an inclination angle in a range of from 10 to 60 degrees, and the inclination angle is gradually increased from the axially inner end to the axially outer end of the crown axial groove so as to slightly curve the crown axial groove,
the crown axial grooves each comprise a narrow portion whose width is in a range of from 0.3 to 1.0 mm, and a wide portion extending axially outwardly from the axially outer end of the narrow portion and having a width gradually increasing toward the shoulder main groove, and the narrow portion has an axial length in a range of from 0.10 to 0.60 times the axial length of the crown axial groove,
the crown axial grooves are each provided in its axially outer end portion with a tie bar protruding from the groove bottom and provided with a sipe extending along the crown axial groove,
the shoulder axial grooves are each slightly curved and inclined with respect to the tire circumferential direction to the same direction as the cords of the radially outermost breaker ply, the shoulder axial grooves each comprise a narrow portion having a width in a range of from 0.3 to 1.0 mm and extending axially outwardly from the shoulder main groove, and a wide portion having a width larger than the width of the narrow portion and extending axially outwardly from the axially outer end of the narrow portion,
the tread portion is provided between every two of the circumferentially adjacent crown axial grooves with a crown sipe, which extends axially inwardly from the shoulder main groove, while slightly curving along the crown axial grooves and terminates without reaching the central main groove, and
the tread portion is further provided between every two of the circumferentially adjacent shoulder axial grooves with an independent shoulder sipe whose both ends are closed and which extends along the shoulder axial grooves while slightly curving along the shoulder axial grooves.

2. The pneumatic tire according to claim 1, wherein
the tread portion is provided with a circumferential sipe extending between the wide portions of every two of the circumferentially adjacent crown axial grooves.

3. The pneumatic tire according to claim 2, wherein
the circumferential sipe has a width in a range of from 0.4 to 1.5 mm.

4. The pneumatic tire according to claim 3, wherein the sipe of the tie bar is opened at both ends of the tie bar.

5. The pneumatic tire according to claim 3, wherein
the height of the tie bar is in a range of from 1.0 to 3.5 mm.

6. The pneumatic tire according to claim 2, wherein the sipe of the tie bar is opened at both ends of the tie bar.

7. The pneumatic tire according to claim 2, wherein
the height of the tie bar is in a range of from 1.0 to 3.5 mm.

8. The pneumatic tire according to claim 1, wherein the sipe of the tie bar is opened at both ends of the tie bar.

9. The pneumatic tire according to claim 8, wherein the height of the tie bar is in a range of from 1.0 to 3.5 mm.

10. The pneumatic tire according to claim 1, wherein the height of the tie bar is in a range of from 1.0 to 3.5 mm.

11. The pneumatic tire according to claim 1, wherein the tread portion is provided with a circumferential sipe extending between every two of the circumferentially adjacent shoulder axial grooves.

* * * * *